(12) United States Patent
Takechi

(10) Patent No.: US 12,242,238 B2
(45) Date of Patent: Mar. 4, 2025

(54) DATA PROCESSING DEVICE, DATA PROCESSING METHOD AND RECORDING MEDIUM

(71) Applicant: Konica Minolta, Inc., Tokyo (JP)

(72) Inventor: Taro Takechi, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 680 days.

(21) Appl. No.: 17/359,906

(22) Filed: Jun. 28, 2021

(65) Prior Publication Data

US 2022/0004161 A1 Jan. 6, 2022

(30) Foreign Application Priority Data

Jul. 1, 2020 (JP) .................................. 2020-113692

(51) Int. Cl.
G05B 19/401 (2006.01)

(52) U.S. Cl.
CPC .. *G05B 19/401* (2013.01); *G05B 2219/23399* (2013.01)

(58) Field of Classification Search
CPC .................... G05B 19/401; G05B 2219/23399
See application file for complete search history.

(56) References Cited

U.S. PATENT DOCUMENTS

| 5,181,181 A | * | 1/1993 | Glynn | ................... G06F 3/0346 345/163 |
| 6,246,468 B1 | * | 6/2001 | Dimsdale | ............. G01B 11/002 356/4.02 |
| 7,430,312 B2 | * | 9/2008 | Gu | ...................... G01B 11/2545 348/42 |

FOREIGN PATENT DOCUMENTS

| JP | 2007164383 A | 6/2007 | |
| JP | 2015097688 A | 5/2015 | |
| WO | WO-2017159382 A1 * | 9/2017 | ............. G01B 11/00 |

OTHER PUBLICATIONS

JPO Notice of Reasons for Refusal for corresponding JP Application 2020-113692; Issued Jan. 23, 2024.

* cited by examiner

*Primary Examiner* — Elias Desta
(74) *Attorney, Agent, or Firm* — CANTOR COLBURN LLP

(57) ABSTRACT

A data processing device processes measurement data measured by a sensor that measures three-dimensional coordinates of a measurement object from a first position and a second position which are different. The data processing device includes a controller. The controller acquires measurement data of three or more planes of the measurement object from the sensor, the planes having different normal vectors. The controller finds, from the acquired measurement data, a transformation expression that integrates a coordinate system of the sensor at the second position into a coordinate system of the sensor at the first position.

11 Claims, 5 Drawing Sheets

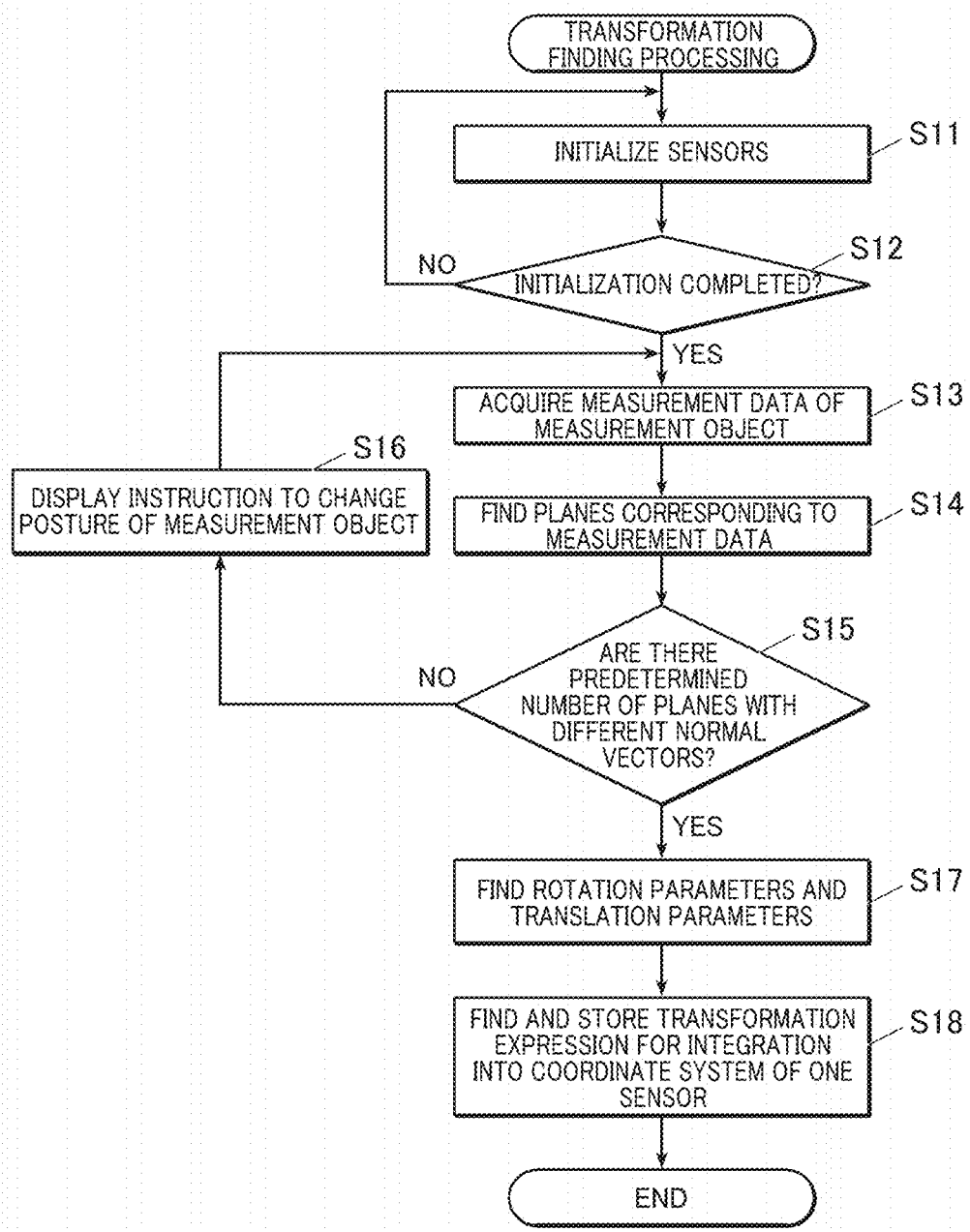

DATA PROCESSING DEVICE, DATA PROCESSING METHOD AND RECORDING MEDIUM

CROSS-REFERENCE TO RELATED APPLICATIONS

The present invention claims priority under 35 U.S.C. § 119 to Japanese Patent Application No. 2020-113692 filed on Jul. 1, 2020 is incorporated herein by reference in its entirety.

BACKGROUND

Technical Field

The present invention relates to a data processing device, a data processing method and a recording medium.

Background Art

A known technique measures a location of a measurement object by measuring the object with a sensor. For example, a three-dimensional data processing device photographs an object to be measured (measurement object) in different directions and obtains a geometrical and positional relation between textures of pieces of image data (JP 2015-97688A). Thereby, the device determines a place of shape data of the object.

A known imaging object marking system photographs a subject (measurement object) using markers associated with the subject (JP 2007-164383A).

The system finds two-dimensional coordinates of the subject based on:
  preset three-dimensional coordinates of the subject and markers; and
  two-dimensional coordinates of markers in a captured image.

To measure a measurement object using (three-dimensional) sensors, it is required to integrate coordinate systems of the sensors. In the three-dimensional data processing device of JP 2015-97688A, it is necessary that shooting places overlap by a predetermined range or more, that is, visual fields overlap. It is difficult to apply it to systems that measure a wide range. In the imaging object marking system of JP 2007-164383A, it is necessary to accurately measure the three-dimensional coordinates of markers in advance. It is difficult to apply it to systems that measure a wide range.

SUMMARY OF INVENTION

An object of the present invention is to easily integrate coordinate systems of measurement at different positions even in a system that measures a wide range.

To achieve at least one of the above mentioned objects, according to an aspect of the present invention, a data processing device processes measurement data measured by a sensor that measures three-dimensional coordinates of a measurement object from a first position and a second position which are different.

The data processing device includes a controller that:
  acquires measurement data of three or more planes of the measurement object from the sensor, the planes having different normal vectors, and
  finds, from the acquired measurement data, a transformation expression that integrates a coordinate system of the sensor at the second position into a coordinate system of the sensor at the first position.

According to another aspect of the present invention, a data processing method of processing measurement data measured by a sensor which measures three-dimensional coordinates of a measurement object from a first position and a second position which are different includes:
  acquiring the measurement data of three or more planes of the measurement object from the sensor, the planes having different normal vectors; and
  finding, from the acquired measurement data, a transformation expression that integrates a coordinate system of the sensor at the second position into a coordinate system of the sensor at the first position.

According to still another aspect of the present invention, a recording medium stores a program which makes a computer of a data processing device function as a controller, the data processing device processing measurement data measured by a sensor that measures three-dimensional coordinates of a measurement object from a first position and a second position which are different,
  wherein the controller:
    acquires the measurement data of three or more planes of the measurement object from the sensor, the planes having different normal vectors; and
    finds, from the acquired measurement data, a transformation expression that integrates a coordinate system of the sensor at the second position into a coordinate system of the sensor at the first position.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a flowchart showing transformation finding processing.

DESCRIPTION OF EMBODIMENTS

Details of an embodiment according to the present invention and first to fourth modifications will be described with reference to drawings. The present invention is not limited to examples shown in figures.

Embodiment

Figure 1:
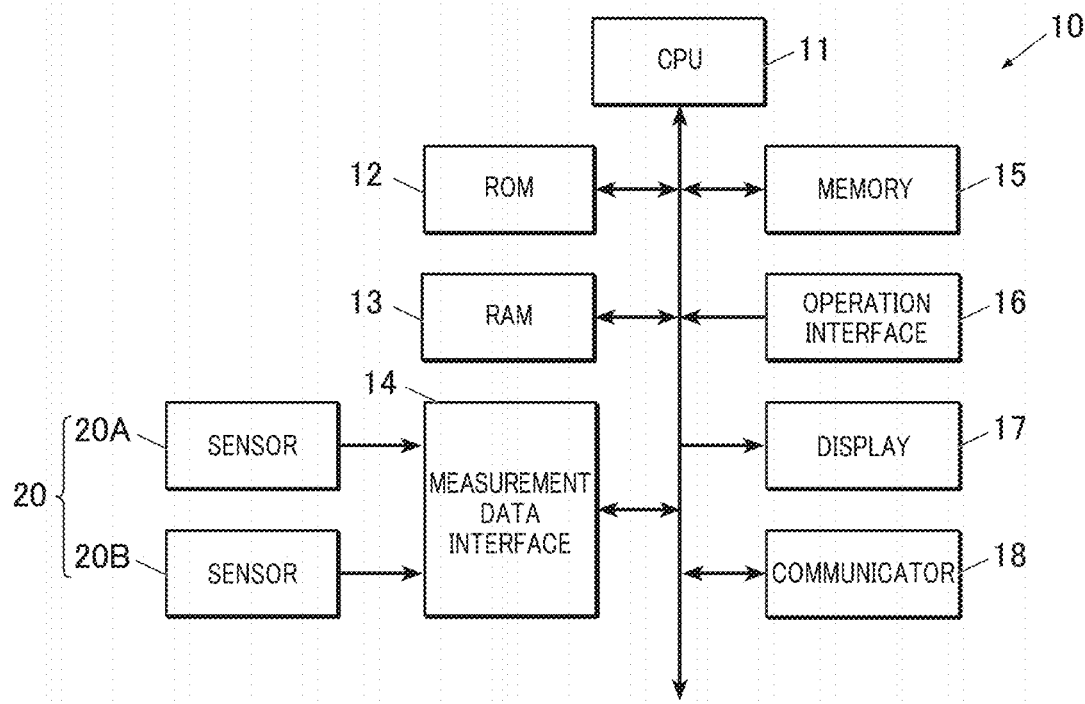
FIG. 1 is a block diagram showing functional configuration of a data processing device according to an embodiment of the present invention.
Figure 2:
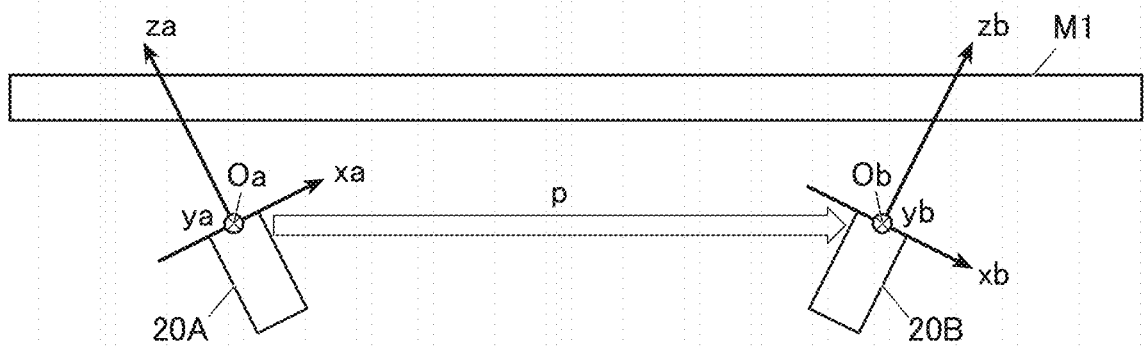
FIG. 2 shows an example of arrangement of a sensor of the embodiment and a measurement object.

An embodiment according to the present invention will be described with reference to FIG. 1 to FIGS. 4A-FIG. 4B. First, device configuration of the embodiment will be described with reference to FIG. 1 to FIG. 2. FIG. 1 is a block diagram showing functional configuration of the data processing device 10 of the embodiment. FIG. 2 shows an example of arrangement of sensors 20A, 20B of the embodiment and a measurement object M1.

The data processing device 10 of the embodiment is an information processing device that executes data processing of integrating coordinates of measurement data of the two sensors using measurement data acquired from the sensor group 20.

As shown in FIG. 1, the data processing device 10 includes a CPU (central processing unit) 11 as a controller, ROM (read only memory) 12, RAM (random access memory) 13, and a measurement data interface 14, memory 15, an operation interface 16, a display 17, and a communicator 18. The sensor group 20 include the sensors 20A, 20B.

The CPU 11 comprehensively controls processing operation of parts of the data processing device 10. Specifically, the CPU 11 reads various processing programs stored in the ROM 12 and develops them in the RAM 13. The CPU cooperates with the developed programs to execute processing of various kinds.

The ROM 12 is memory that reads various data. The ROM 12 stores various processing programs and data such as parameters and files necessary for executing the program. The ROM 12 stores a transformation finding program for executing transformation finding processing described later.

The RAM 13 constitutes a work area where various programs read from the ROM 12 and data such as input data, output data, and parameters are temporarily stored in processing of various kinds which are executed by the CPU 11.

The measurement data interface 14 performs data communication with the sensors 20A, 20B connected via a cable. The measurement data interface 14 acquires measurement data from the sensors 20A, 20B.

The memory 15 is composed of an HDD (hard disk drive), an SSD (solid state drive), non-volatile semiconductor memory, and the like. The memory 15 stores various data such that they can be read and written.

The operation interface 16 includes a keyboard equipped with cursor keys, letter keys, various function keys, etc. and a pointing device such as a mouse. The operation interface 16 outputs operation information to the CPU 11. The operation information is inputted by key operation on the keyboard or positional operation on the mouse or the like. The operation interface 16 may include a touch panel piled on a display screen of the display 17. The operation interface 16 outputs the operation information to the CPU 11 according to positions of touch operation by an operator's finger or the like.

The display 17 includes a monitor such as an LCD (liquid crystal display) or an EL (electroluminescence) display. The display 17 displays various screens on the monitor according to commands of display information which are inputted from the CPU 11.

The communicator 18 is constituted by a network interface or the like. The communicator 18 transmits/receives data to/from external devices connected via a communication network such as a LAN (local area network), a WAN (wide area network), or the internet.

Each of the sensors 20A, 20B is a three-dimensional sensor. The sensors 20A, 20B measure a distance to a measurement object and output measurement data of three-dimensional coordinates which indicates a surface of the measurement object. The three-dimensional sensor is, for example, a sensor of a stereo camera method, a sensor of TOF (time of flight method) such as LIDAR (light detection and ranging) and millimeter wave radar, or a sensor of an active stereo method.

The sensor of stereo cameras includes two cameras at different places. The sensor measures a location and a distance to a subject, which is a measurement object, by comparing pieces of image data captured by the cameras.

A LIDAR ranging sensor includes:
  an irradiation unit of a laser that emits light in a pulsed manner; and
  a light receptor that measures scattered light caused by laser irradiation.

The ranging sensor measures a location and a distance to a measurement object, which corresponds to a time between laser irradiation and reception of scattered light.

A ranging sensor of a millimeter wave radar includes:
  a synthesizer that generates millimeter wave signals;
  a TX (transmitter) antenna that transmits radio waves according to millimeter wave signals; and
  an RX (receiver) antenna that receives radio waves that have been reflected on a measurement object and returned.

The ranging sensor measures a location and a distance to a measurement object, which corresponds to a time between transmission and reception of a radio wave. In a ranging sensor of an active stereo method, one camera of the stereo cameras is replaced with a projector of light such as spot light, slit light, and multi-pattern light. One camera of the ranging sensor captures and detects light projected on an object. The ranging sensor measures a location and a distance to a point where light is projected. The CPU 11 may execute at least a part of information processing of generation of measurement data in the sensors.

As shown in FIG. 2, a case where a location of a measurement object M1 is measured with the sensors 20A, 20B will be described. The measurement object M1 is a reference flat plate.

The sensors 20A, 20B are arranged in different positions (locations and postures). The sensors 20A, 20B respectively have their own (independent) three-dimensional coordinate systems. The origin O, x-axis, y-axis, and z-axis in a coordinate system of the sensor 20A are the origin $O_a$, $x_a$-axis, $y_a$-axis, and $z_a$-axis. The origin O, x-axis, y-axis, and z-axis in a coordinate system of the sensor 20B are the origin $O_b$, $x_b$-axis, $y_b$-axis, and $z_b$-axis. FIG. 2 shows a case where the $y_a$-axis and the $y_b$-axis of the sensors 20A, 20B are parallel. The present invention is not limited to this.

The sensors 20A, 20B are arranged such that normal vectors are different, the normal vectors being:
  a normal vector of a surface of the measurement object M1 on extension of an optical axis ($z_a$-axis) of the sensor 20A; and
  a normal vector of a surface of the measurement object M1 on extension of an optical axis ($z_b$-axis) of the sensor 20B.

Measurement data of the sensor 20A is coordinate data ($x_a$, $y_a$, $z_a$) of a point on the surface of the measurement object M1 in the coordinate system of the sensor 20A. Measurement data of the sensor 20B is coordinate data ($x_b$, $y_b$, $z_b$) of a point on the surface of the measurement object M1 in the coordinate system of the sensor 20B.

The coordinate system of the sensor 20B is transformed into the same coordinate system as the coordinate system of the sensor 20A by:

rotation about the $x_b$-axis by a rotation angle $\theta_x$, rotation about the $y_b$-axis by a rotation angle $\theta_y$, and rotation about the $z_b$-axis by a rotation angle $\theta_z$; and parallel movement in the $x_a$-axis direction by $p_x$, parallel movement in the y-axis direction by $p_y$, and parallel movement in the z-axis direction by $p_z$ (vector $p=(p_x, p_y, p_z)$).

The rotation angle $\theta_x$ in a direction from the $y_b$-axis to the $z_b$-axis around the $x_b$-axis is positive. The rotation angle $\theta_y$ in a direction from the $z_b$-axis to the $x_b$-axis around the $y_b$-axis is positive. The rotation angle $\theta_z$ in a direction from the $x_b$-axis to the $y_b$-axis is positive. The embodiment proposes a method of easily finding the six parameters, i.e., rotation parameters $\theta_x$, $\theta_y$, $\theta_z$ and translation parameters $p_x$, $p_y$, $p_z$.

Figure 4A:
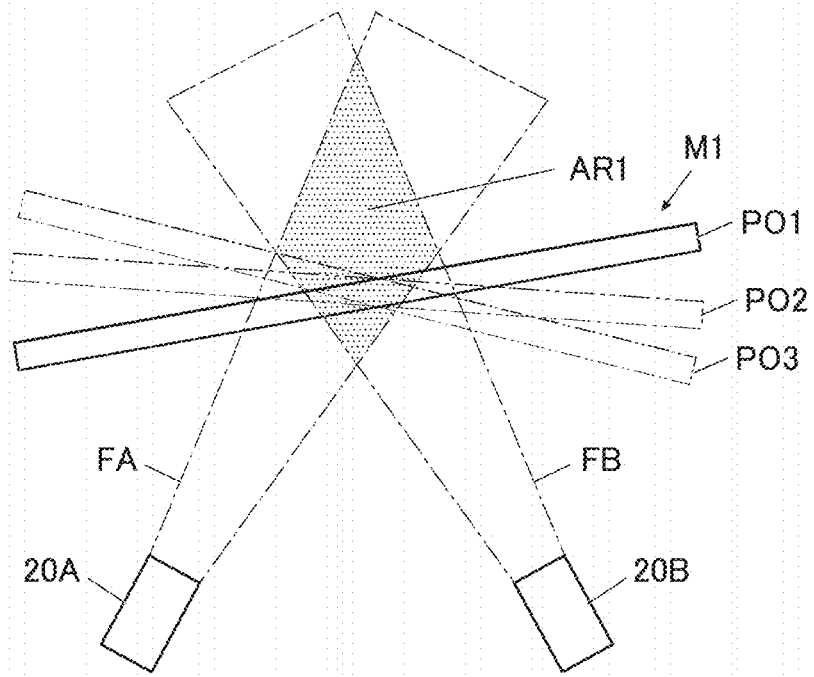
FIG. 4A shows the sensor of the embodiment in a state where visual fields overlap, and the measurement object in changed postures.
Figure 4B:
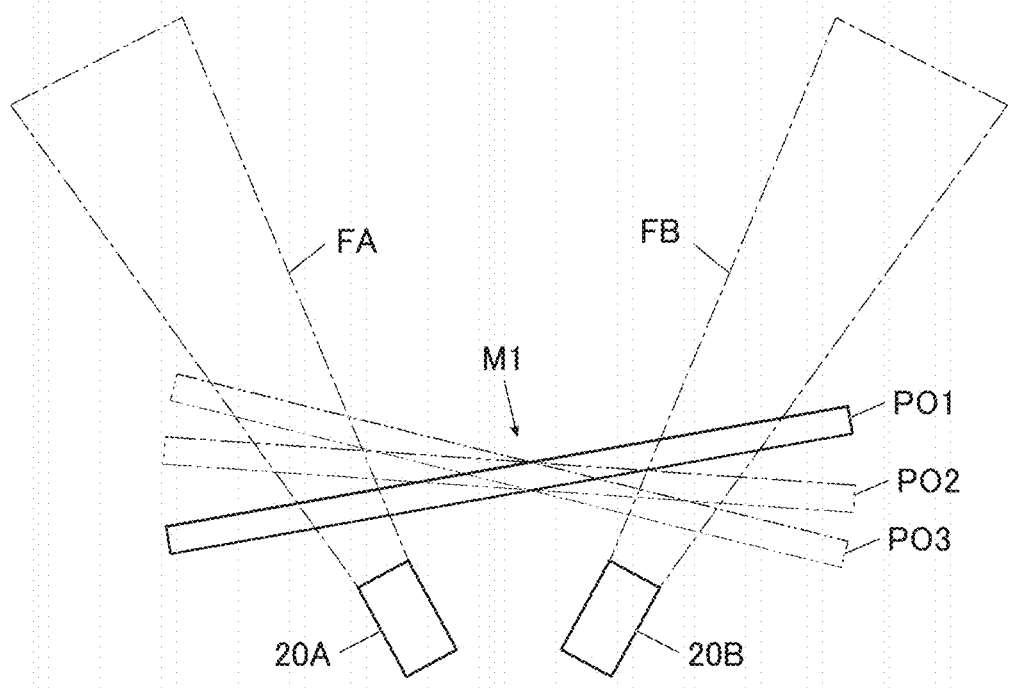
FIG. 4B shows the sensor of the embodiment in a state where visual fields do not overlap, and the measurement object in changed postures.

Operation of the data processing device 10 will be described with reference to FIG. 3 to FIG. 4A and FIG. 4B. FIG. 3 is a flowchart showing transformation finding processing. FIG. 4A is a diagram showing the sensors 20A, 20B of the embodiment in a state where visual fields overlap, and the measurement object M1 in changed postures. FIG. 4B is a diagram showing the sensors 20A, 20B of the embodiment in a state where the visual fields do not overlap, and the measurement object M1 in the changed postures.

The transformation finding processing executed by the data processing device 10 will be described with reference to FIG. 3. In the transformation finding processing, the sensors 20A, 20B measure a measurement object. The rotation parameters $\theta_x$, $\theta_y$, $\theta_z$ and the translation parameters $p_x$, $p_y$, $p_z$ are found. A transformation expression that transforms the coordinate system of the sensor 20B into the coordinate system of the sensor 20A is found with the rotation parameters $\theta_x$, $\theta_y$, $\theta_z$ and the translation parameters $p_x$, $p_y$, $p_z$.

In the embodiment, as shown in FIG. 4A, the sensors 20A, 20B are arranged such that, for example, a visual field FA of the sensor 20A and a visual field FB of the sensor 20B overlap in an area AR1. The measurement object M1 is placed such that one surface plane of the measurement object M1 is included in at least the visual fields FA, FB (area AR1). A posture of the measurement object M1 is changed to postures PO1, PO2, and PO3. Measurement data in each posture is measured. Thus, in order to obtain the rotation parameters $\theta_x$, $\theta_y$, $\theta_z$ and the translation parameters $p_x$, $p_y$, $p_z$, it is necessary to measure the measurement object M1 in three or more postures while positions of the sensors 20A, 20B are fixed.

Alternatively, the sensors 20A, 20B may be arranged such that the visual fields FA, FB of the sensors 20A, 20B do not overlap as shown in FIG. 4B.

In the data processing device 10, for example, in response to input of command for execution of the transformation finding processing from an operator via the operation interface 16, the CPU 11 executes transformation finding processing according to transformation finding program stored in the ROM 12.

As shown in FIG. 3, first, the CPU 11 initializes the sensors 20A, 20B (Step S11). Then, the CPU 11 determines whether initialization of the sensors 20A, 20B is completed (Step S12). In a case where the initialization is not completed (NO in Step S12), the processing proceeds to Step S11.

In a case where the initialization is completed (YES in Step S12), the CPU 11 acquires measurement data $(x_{ai}, y_{ai}, z_{ai})$ (variable "i"=1, 2, ...) of a surface plane of the measurement object M1 in one posture from the sensor 20A via the measurement data interface 14. The CPU 11 acquires measurement data $(x_{bi}, y_{bi}, z_{bi})$ of the surface plane of the measurement object M1 in the same posture from the sensor 20B (Step S13). In Step S13 for the first time, "i" is 1. The measurement data $(x_{ai}, y_{ai}, z_{ai})$ is three-dimensional coordinate data of points on a surface plane of the measurement object M1 which include an intersection $(0, 0, z_{ai})$ on the $z_a$-axis. The measurement data $(x_{bi}, y_{bi}, z_{bi})$ is three-dimensional coordinate data of points on a surface plane of the measurement object M1.

The CPU 11 finds a plane $P_{ai}$ from the measurement data $(x_{ai}, y_{ai}, z_{ai})$ acquired in Step S13 in the least-squares method. The CPU 11 also finds a plane $P_{bi}$ from the acquired measurement data $(x_{bi}, y_{bi}, z_{bi})$ in the least-squares method (Step S14). In Step S14, the plane $P_{ai}$ corresponding to the measurement data $(x_{ai}, y_{ai}, z_{ai})$ and the plane $P_{bi}$ corresponding to the measurement data $(x_{bi}, y_{bi}, z_{bi})$ are expressed by the following Expressions (1), (2) ("i" is omitted)

$$\begin{pmatrix} 0 \\ 0 \\ z_a \end{pmatrix} + t \begin{pmatrix} 1 \\ 0 \\ dz_{ax} \end{pmatrix} + s \begin{pmatrix} 0 \\ 1 \\ dz_{ay} \end{pmatrix} \quad (1)$$

$$\begin{pmatrix} 0 \\ 0 \\ z_b \end{pmatrix} + t' \begin{pmatrix} 1 \\ 0 \\ dz_{bx} \end{pmatrix} + s' \begin{pmatrix} 0 \\ 1 \\ dz_{by} \end{pmatrix} \quad (2)$$

t: one x-coordinate in $x_a$-axis direction on the plane of Expression (1)

s: one y-coordinate in $y_a$-axis direction on the plane of Expression (1)

$dz_{ax}$: $z_a$ increment for one increment in the $x_a$-axis direction (partial differential of $z_a$ in the $x_a$-axis direction)

$dz_{ay}$: $z_a$ increment for one increment in the $y_a$-axis direction (partial differential of $z_a$ in the $y_a$-axis direction)

t': one x-coordinate in the $x_b$-axis direction on the plane of Expression (2)

s': one y-coordinate in the $y_b$-axis direction on the plane of Expression (2)

$dz_{bxi}$: $z_b$ increment for one increment in the $x_b$-axis direction (partial differential of $z_b$ in the $x_b$-axis direction)

$dz_{byi}$: $z_b$ increment for one increment in the $y_b$-axis direction (partial differential of $z_b$ in the $y_b$-axis direction)

The CPU 11 calculates a normal vector $v_{ai}$ of the plane $P_{ai}$ found in Step S14 and a normal vector $v_{bi}$ of the plane $P_{bi}$. The CPU 11 determines whether there are a predetermined number (preset value of three or more) of surface planes having different normal vectors $v_{ai}$, $v_{bi}$ (Step S15).

In a case where there are not the predetermined number of surface planes of the different normal vectors $v_{ai}$, $v_{bi}$ (NO in Step S15), the CPU 11 displays a message instructing change of a posture of the measurement object M1 on the display 17. The CPU 11 increases the variable "i" by one (Step S16), and proceeds to Step S13. An operator changes the posture of the measurement object M1 in response to Step S16.

In a case where there are the predetermined number of surface planes of the different normal vectors $v_{ai}$, $v_{bi}$ (YES in Step S15), the CPU 11 finds the rotation parameters $\theta_x$, $\theta_y$, $\theta_z$ and the translation parameters $p_x$, $p_y$, $p_z$ using the three or more different normal vectors $v_{ai}$, $v_{bi}$ (Step S17).

A method of calculating the rotation parameters $\theta_x$, $\theta_y$, $\theta_z$ in Step S17 will be described. Rotation about the $x_b$-axis (rotation angle $\theta_x$), rotation about the $y_b$-axis (rotation angle $\theta_y$), and rotation about the $z_b$-axis (rotation angle $\theta_z$) are represented by a rotation matrix $R_x$, a rotation matrix $R_y$, and a rotation matrix $R_z$, respectively. To make expressions easier to read, $\theta_x$, $\theta_y$, and $\theta_z$ are represented by $\theta$, $\varphi$, and $\psi$, respectively. The rotation by $R_x$, $R_y$, and $R_z$ is expressed by following Expression (4) using following Expression (3).

$$R_x = \begin{pmatrix} 1 & 0 & 0 \\ 0 & \cos\theta & -\sin\theta \\ 0 & \sin\theta & \cos\theta \end{pmatrix}, R_y = \begin{pmatrix} \cos\varphi & 0 & \sin\varphi \\ 0 & 1 & 0 \\ -\sin\varphi & 0 & \cos\varphi \end{pmatrix}, R_z = \begin{pmatrix} \cos\psi & -\sin\psi & 0 \\ \sin\psi & \cos\psi & 0 \\ 0 & 0 & 1 \end{pmatrix} \quad (3)$$

$$R_x R_y R_z = \begin{pmatrix} \cos\varphi\cos\psi & -\cos\varphi\sin\psi & \sin\varphi \\ \sin\theta\sin\varphi\cos\psi + \cos\theta\sin\psi & -\sin\theta\sin\varphi\sin\psi + \cos\theta\cos\psi & -\sin\theta\cos\varphi \\ -\cos\theta\sin\varphi\cos\psi + \sin\theta\sin\psi & \cos\theta\sin\varphi\sin\psi + \sin\theta\cos\psi & \cos\theta\cos\varphi \end{pmatrix} \quad (4)$$

Different normal vectors $V_{ai}$, $v_{bi}$ among all the normal vectors $v_{ai}$, $v_{bi}$ are represented by normal vectors $v_{a1}$, $v_{a2}$, ..., $v_{an}$ and normal vectors $v_{b1}$, $v_{b2}$, ..., $v_{bn}$ ("n" is a natural number). Following Expression (5) holds.

$$(v_{a1} v_{a2} \ldots v_{an}) = R_x R_y R_z (v_{b1} v_{b2} \ldots v_{bn}) \quad (5)$$

In Expression (5), we assume "$A = R_x R_y R_z B$" and "$R = R_x R_y R_z$". In a case where "n" is 3, $\theta$, $\varphi$, and $\psi$, i.e., the rotation parameters $\theta_x$, $\theta_y$, $\theta_z$ are calculated by the following Expression (6) using "$B = R^{-1} A$".

$$R = AB^{-1} \quad (6)$$

For example, the rotation parameters $\theta_x$, $\theta_y$, $\theta_z$ are calculated by Expression (6) corresponding to the variable "i" (n=3) corresponding to three sets of normal vectors corresponding to the postures PO1, PO2, PO3 of the measurement object M1.

In Expression (5), in a case where "n" is more than three, an error of $R_x R_y R_z$ is reduced in the least-squares method by following Expression (7) using a generalized inverse matrix $(R^T R)^{-1} R^T$ ($R^T$ is a transposed matrix of R). Thus, $\theta$, $\varphi$, and $\psi$, i.e., the rotation parameters $\theta_x$, $\theta_y$, $\theta_z$ are calculated.

$$B = (R^T R)^{-1} R^T A \quad (7)$$

A method of calculating the translation parameters $p_x$, $p_y$, $p_z$ in Step S17 will be described. First, a position vector from the origin $\theta_a$ of the sensor 20A to the origin $O_b$ of the sensor 20B is represented by "$p = (p_x, p_y, p_z)$". Following Expression (8) holds.

$$t \begin{pmatrix} 1 \\ 0 \\ dz_{ax} \end{pmatrix} + s \begin{pmatrix} 0 \\ 1 \\ dz_{ay} \end{pmatrix} + R_x R_y R_z \begin{pmatrix} 0 \\ 0 \\ z_b \end{pmatrix} + \begin{pmatrix} p_x \\ p_y \\ p_z \end{pmatrix} = \quad (8)$$

$$t \begin{pmatrix} 1 \\ 0 \\ dz_{ax} \end{pmatrix} + s \begin{pmatrix} 0 \\ 1 \\ dz_{ay} \end{pmatrix} + \begin{pmatrix} r_{xb} \\ r_{yb} \\ r_{zb} \end{pmatrix} + \begin{pmatrix} p_x \\ p_y \\ p_z \end{pmatrix} = \begin{pmatrix} 0 \\ 0 \\ z_a \end{pmatrix}$$

Following Expression (9) is obtained by substituting "$-p_x - r_{xb}$" and "$-p_y - r_{yb}$" respectively for "t" and "s" in Expression (8).

$$dz_{ax}(p_x + r_{xb}) - dz_{ay}(p_y + r_{yb}) + r_{zb} + p_z = z_a \quad (9)$$

Values of $-dz_{ax}$, $r_{xb}$, $dz_{ay}$, $r_{yb}$, $r_{zb}$, and $z_a$ are known. Accordingly, the translation parameters $p_x$, $p_y$, $p_z$ are found by solving three Expressions (9) corresponding to the variable "i" for three or more postures of the measurement object M1.

The CPU 11 finds a transformation expression that integrates (transforms) the coordinate system of the sensor 20B into the coordinate system of the sensor 20A using the rotation parameters $\theta_x$, $\theta_y$, $\theta_z$ and the translation parameters $p_x$, $p_y$, $p_z$ found in Step S17. The CPU 11 stores the transformation expression in the memory 15 (Step S18), and ends the transformation finding processing.

The transformation expression in Step S18 is expressed by following Expression (10) using:
  a three-dimensional coordinate position $(x_B, y_B, z_B)$ in the coordinate system of the sensor 20B before transformation; and
  a three-dimensional coordinate position $(x_A, y_A, z_A)$ in the coordinate system of the sensor 20A after transformation.

$$\begin{pmatrix} x_A \\ y_A \\ z_A \end{pmatrix} = R_x R_y R_z \begin{pmatrix} x_B \\ y_B \\ z_B \end{pmatrix} + \begin{pmatrix} p_x \\ p_y \\ p_z \end{pmatrix} \quad (10)$$

As described above, according to the embodiment, the data processing device 10 processes measurement data measured by the sensors 20A, 20B. The sensors 20A, 20B measure the three-dimensional coordinates of the measurement object M1 from different positions. The data processing device 10 includes the CPU 11. The CPU 11 acquires measurement data of three or more planes of the measurement object M1 from the sensors 20A, 20B. The three or more planes have different normal vectors. From the acquired measurement data, the CPU 11 finds the transformation expression that integrates the coordinate system of the sensor 20B into the coordinate system of the sensor 20A. Therefore, even in a system that measures a wide range, the coordinate systems for measurement at different positions are easily integrated by integrating the coordinate system of the sensor 20B into the coordinate system of the sensor 20A.

The sensors 20A, 20B at different positions are separate. Therefore, a surface of the measurement object M1 is easily measured while positions of the sensors 20A, 20B are fixed.

The visual fields FA, FB of the sensors 20A, 20B overlap each other. Alternatively, the visual fields FA, FB of the sensors 20A, 20B may not overlap. In the case where the visual fields do not overlap, the coordinate systems of measurement at different positions are easily integrated even in a system that measures a wide range.

An object to be measured is the measurement object M1 having a physical plane. Therefore, the measurement object M1 is easily measured.

A posture of the measurement object M1 can be changed. The sensors 20A, 20B measure planes in a state where the posture of the measurement object M1 is changed (postures PO1, PO2, PO3). Therefore, the planes of the measurement object M1 are easily measured by changing the posture of the measurement object M1.

From the acquired measurement data, the CPU 11 finds:
the rotational parameters $\theta_x$, $\theta_y$, $\theta_z$ for rotation to align three-dimensional axes of the sensor 20B with axes of the sensor 20A; and
the translation parameters $p_x$, $p_y$, $p_z$ for translation of the origin of the three-dimensional coordinate system of the sensor 20B to the origin of the three-dimensional coordinate system of the sensor 20A.

The CPU 11 finds the transformation expression based on the found rotation parameters $\theta_x$, $\theta_y$, $\theta_z$ and the translation parameters $p_x$, $p_y$, $p_z$. Therefore, the transformation expression that integrates the coordinate system of the sensor 20B into the coordinate system of the sensor 20A is found easily and accurately.

First Modification

Figure 5:
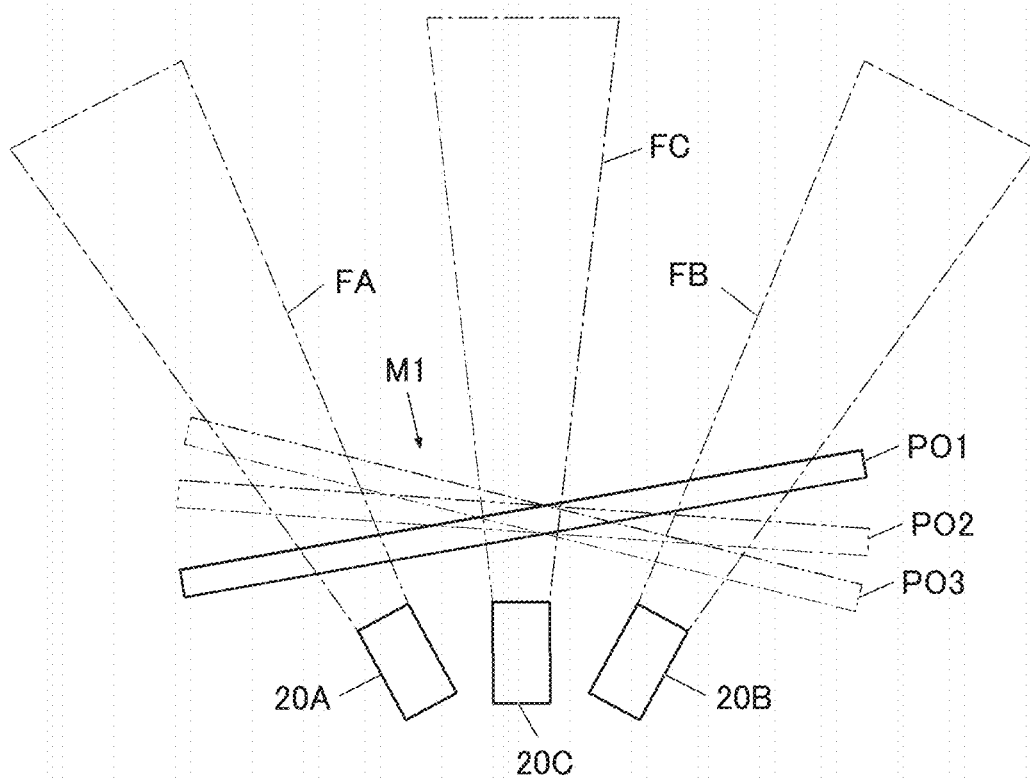
FIG. 5 shows a sensor in a first modification and the measurement object in changed postures.

A first modification of the above embodiment will be described with reference to FIG. 5. FIG. 5 shows the sensors 20A, 20B, 20C of the modification and the measurement object M1 in changed postures.

According to the data processing device 10 of the above embodiment, the sensor group 20 includes two sensors 20A, 20B. On the other hand, according to the data processing device 10 of the modification, the sensor group 20 includes three sensors 20A, 20B, 20C. Alternatively, the sensor group 20 may include four or more sensors. In the data processing device 10 of the modification, the same reference numerals are given to the same parts as those in the data processing device 10 of the above embodiment. Explanation is omitted.

The sensor 20C is a three-dimensional measurement sensor like the sensors 20A, 20B. The sensor 20C is at a position different from those of the sensors 20A, 20B.

Next, operation of the data processing device 10 will be described. As shown in FIG. 5, the sensors 20A, 20B, 20C are arranged such that, for example, the visual fields FA, FB, FC of the sensors 20A, 20B, 20C do not overlap. A posture of the measurement object M1 is changed to the postures PO1, PO2, PO3 so that at least one surface plane of the measurement object M1 is included in the visual fields FA, FB, FC. The surface plane in each posture is measured. Thus, in order to find the rotation parameters $\theta_x$, $\theta_y$, $\theta_z$ and the translation parameters $p_x$, $p_y$, $p_z$, the surface plane of the measurement object M1 in three or more postures are measured while locations of the sensors 20A, 20B, 20C are fixed. Alternatively, the visual fields FA, FB, FC of the sensors 20A, 20B, 20C may overlap in one area.

Also in the modification, the data processing device 10 executes the same processing as the transformation finding processing. In the modification, for example, a transformation expression that integrates a coordinate system of one sensor into a coordinate system of another sensor is found.

For example, the transformation expression is:
a transformation expression that integrates the coordinate system of the sensor 20B into the coordinate system of the sensor 20A; or
a transformation expression that integrates the coordinate system of the sensor 20C into the coordinate system of the sensor 20A.

In Step S11, the CPU 11 initializes the sensors 20A, 20B, 20C. In Step S12, the CPU 11 determines whether initialization of the sensors 20A, 20B, 20C is completed. In Step S13, the CPU 11 acquires measurement data of a surface plane of the measurement object M1 in one posture from the sensors 20A, 20B, 20C. In Step S14, the CPU 11 calculates a normal vector of the plane from the measurement data of the sensors 20A, 20B, 20C. In Step S15, the CPU 11 calculates normal vectors corresponding to the measurement data of the sensors 20A, 20B. The CPU 11 determines whether there are a predetermined number of surface planes having different normal vectors. The CPU 11 also calculates normal vectors corresponding to the measurement data of the sensors 20A, 20C. The CPU 11 determines whether there are a predetermined number of surface planes having different normal vectors.

In Step S17, the CPU 11 finds:
rotation parameters and translation parameters that integrate the coordinate system of the sensor 20B into the coordinate system of the sensor 20A; and
rotation parameters and translation parameters that integrate the coordinate system of the sensor 20C into the coordinate system of the sensor 20A.

In Step S18, the CPU 11 uses the rotation parameters and the translation parameters found in Step S17 to find:
a transformation expression that integrates the coordinate system of the sensor 20B into the coordinate system of the sensor 20A; and
a transformation expression that integrates the coordinate system of the sensor 20C into the coordinate system of the sensor 20A.

The CPU 11 stores the transformation expressions in the memory 15.

As described above, according to the modification, the sensor group 20 includes the sensors 20A, 20B, 20C that measure three-dimensional coordinates of a measurement object from three or more different positions. Therefore, sets of transformation expressions (in this modification, two sets) that integrate a coordinate system of a sensor in a second position into a coordinate system of a sensor in a first position are found.

Second Modification

Figure 6:
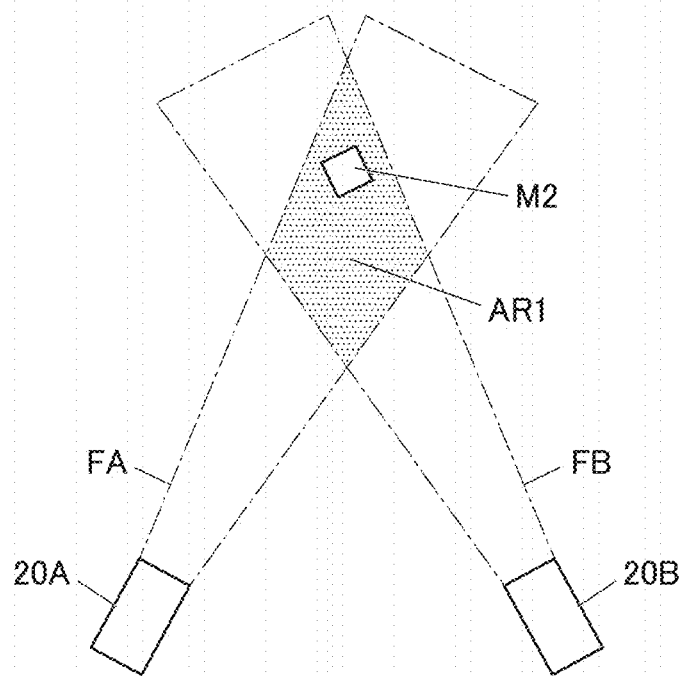
FIG. 6 shows a sensor of the second modification and a fixed measurement object.

A second modification of the above embodiment will be described with reference to FIG. 6. FIG. 6 shows the sensors 20A, 20B of the modification and a fixed measurement object.

The measurement in the above embodiment is performed in the data processing device 10 while a posture of the measurement object M1 is changed to three or more postures. On the other hand, the measurement in the modification is performed in the data processing device 10 while a posture of the measurement object M2 is fixed. In the data processing device 10 of the modification, the same reference numerals are given to the same parts as those in the data processing device 10 of the above embodiment. Explanation is omitted.

Next, operation of the data processing device 10 will be described. As shown in FIG. 6, the sensors 20A, 20B are arranged such that, for example, the visual fields FA, FB of the sensors 20A, 20B overlap in an area AR1. The measurement object M2 includes three or more surface planes that can be measured simultaneously by the sensors 20A, 20B while the measurement object M2 is put in the area AR1. The three or more planes of the measurement object M2 can be distinguished. For example, colors of the planes or shapes around the planes are different to serve as distinction information of the planes. The sensors 20A, 20B acquire the distinction information of the planes of the measurement object M2.

Thus, to obtain the rotation parameters $\theta_x$, $\theta_y$, $\theta_z$ and the translation parameters $p_x$, $p_y$, $p_z$, three or more surface planes of the measurement object M2 in a fixed posture are measured while positions of the sensors 20A, 20B are fixed.

Also in the modification, the same processing as the transformation finding processing is executed in the data processing device 10. Also in the modification, for example, a transformation expression that transforms the coordinate system of the sensor 20B into the coordinate system of the sensor 20A is found.

Steps S11 and S12 are the same as those in the above embodiment. In Step S13, the CPU 11 acquires measurement data of one surface plane of the measurement object M2 with the sensors 20A, 20B. In Step S15, the CPU 11 determines whether there are a predetermined number of surface planes of the measurement object M2 which have different normal vectors corresponding to the measurement data of the sensors 20A, 20B. In Step S16, the CPU 11 selects an unmeasured surface plane of the measurement object M2. In Step S13, measurement data of the selected plane is acquired. Steps S17 and S18 are the same as those in the above embodiment.

As described above, according to the modification, the measurement object M2 includes the three or more surface planes that can be measured in one posture. The sensor 20A and the sensor 20B measure the three or more planes of the measurement object M2 in one posture. Therefore, there is no need for configuration that changes a posture of the measurement object M2. The three or more surface planes of the measurement object M2 are easily measured.

Third Modification

Figure 7:
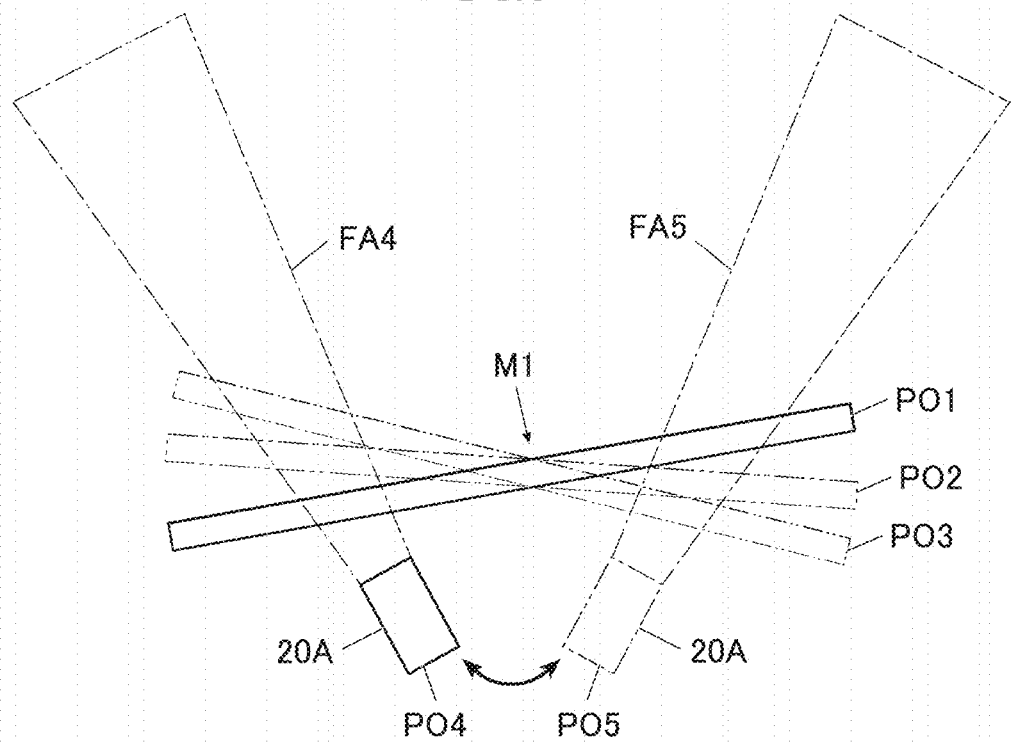
FIG. 7 shows a sensor of the third modification and the measurement object in changed postures.

A third modification of the above embodiment will be described with reference to FIG. 7. FIG. 7 shows the sensor 20A of the modification and the measurement object M1 in changed postures.

In the data processing device 10 of the above embodiment, the sensor group 20 includes the two sensors 20A, 20B. On the other hand, in the modification, the sensor group 20 of the data processing device 10 includes one sensor 20A. In the data processing device 10 of the modification, the same reference numerals are given to the same parts as those in the data processing device 10 of the above embodiment. Explanation is omitted.

A position (location and posture) of the sensor 20A can be changed. The data processing device 10 includes a position changer (not shown) that changes the position of the sensor 20A according to control of the CPU 11.

Next, operation of the data processing device 10 will be described. As shown in FIG. 7, the sensor 20A is placed and its position is changed such that, for example, a visual field FA4 of the sensor 20A at a position PO4 does not overlap with a visual field FA5 of the sensor 20A at a position PO5. Alternatively, the sensor 20A may be placed and its position may be changed such that the visual field FA4 of the sensor 20A at the position PO4 and the visual field FA5 of the sensor 20A at the position PO5 overlap in a predetermined area.

Thus, to obtain the rotation parameters $\theta_x$, $\theta_y$, $\theta_z$ and the translation parameters $p_x$, $p_y$, $p_z$, the three or more surface planes of the measurement object M1 are measured while a position of the sensor 20A and a posture of the measurement object M1 are changed.

Also in the modification, the data processing device 10 executes the same processing as the transformation finding processing. In the modification, for example, a transformation expression that transforms the coordinate system of the sensor 20A at the position PO5 into the coordinate system of the sensor 20A at the position PO4 is found.

In Step S11, the CPU 11 initializes the sensor 20A. In Step S12, the CPU 11 determines whether initialization of the sensor 20A is completed. In Step S13, the CPU 11 changes a position of the sensor 20A to one position, such as the position PO4, with the position changer. The CPU 11 acquires measurement data of a surface plane of the measurement object M1 in one posture with the sensor 20A. The CPU 11 changes a position of the sensor 20A to a different position, such as the position PO5, with the position changer. The CPU 11 acquires measurement data of the surface plane of the measurement object M1 in the posture with the sensor 20A. In Step S13, the CPU 11 calculates a normal vector of the surface plane from the measurement data of the sensor 20A at the position PO4 which is acquired in Step S13. Similarly, the CPU 11 calculates a normal vector of the surface plane from the measurement data of the sensor 20A at the position PO5.

In Step S15, the CPU 11 determines whether there are a predetermined number of surface planes having different normal vectors that correspond to the measurement data of the sensor 20A at positions PO4, PO5. Step S16 is the same as Step S16 in the above embodiment. In Step S17, the CPU 11 finds the rotation parameters and the translation parameters which transform the coordinate system of the sensor 20A at the position PO5 into the coordinate system of the sensor 20A at the position PO4. In Step S18, the CPU 11 uses the rotation parameters and the translation parameters found in Step S17 to find a transformation expression that transforms the coordinate system of the sensor 20A at the position PO5 into the coordinate system of the sensor 20A at the position PO4. The CPU 11 stores the transformation expression in the memory 15.

As described above, according to the modification, one sensor 20A serves as sensors at the two different positions. Therefore, configuration of the sensor group 20 of the data processing device 10 is simple.

Fourth Modification

Figure 8:
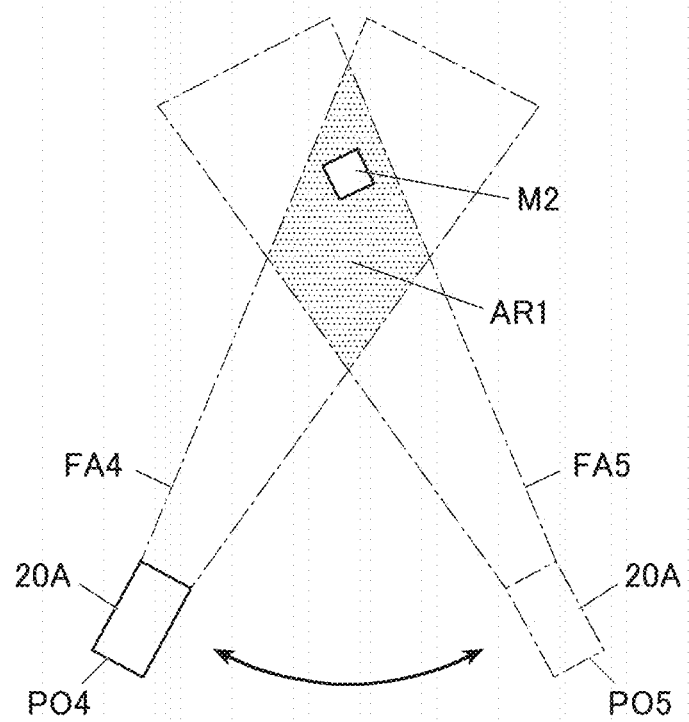
FIG. 8 shows a sensor of the fourth modification and the fixed measurement object.

A fourth modification of the above embodiment will be described with reference to FIG. 8. FIG. 8 shows the sensor 20A in the modification and the fixed measurement object M2.

According to the data processing device 10 of the above embodiment, the sensor group 20 includes the two sensors 20A, 20B. Measurement is performed while a posture of the measurement object M1 is changed to three or more postures. On the other hand, according to the modification, the sensor group 20 has one sensor 20A. Measurement is performed while a posture of the measurement object M2 is fixed. In the data processing device 10 of the modification, the same reference numerals are given to the same parts as those in the data processing device 10 of the above embodiment. Explanation is omitted.

A position (location and posture) of the sensor 20A can be changed. The data processing device 10 includes a position changer (not shown) that changes a position of the sensor 20A according to control of the CPU 11.

Next, operation of the data processing device 10 will be described. As shown in FIG. 8, the sensor 20A is placed and its position is changed such that, for example, a visual field FA6 of the sensor 20A at a position PO6 and a visual field FA7 of the sensor 20A at a position PO7 overlap in an area AR1.

Thus, in order to obtain the rotation parameters $\theta_x$, $\theta_y$, $\theta_z$ and the translation parameters $p_x$, $p_y$, $p_z$, three or more surface planes of the fixed measurement object M2 are measured while a position of the sensor 20A is changed.

Also in the modification, the data processing device 10 executes the same processing as the transformation finding processing. In the modification, for example, a transformation expression that transforms the coordinate system of the sensor 20A at the position PO7 into the coordinate system of the sensor 20A at the position PO6 is found.

In Step S11, the CPU 11 initializes the sensor 20A. In Step S12, the CPU 11 determines whether initialization of the sensor 20A is completed. In Step S13, the CPU 11 moves the sensor 20A to one position, such as position PO6, with the position changer. The CPU 11 acquires measurement data of one surface plane of the measurement object M2 with the sensor 20A. The CPU 11 changes a position of the sensor 20A to a different position, such as the position PO7, with the position changer. The CPU 11 acquires measurement data of the surface plane of the measurement object M2 with the sensor 20A. In Step S13, the CPU 11 calculates a normal vector of the surface plane from the measurement data of the sensor 20A at the position PO6 acquired in Step S13. Similarly, the CPU 11 calculates a normal vector of the surface plane from the measurement data of the sensor 20A at the position PO7.

In Step S15, the CPU 11 determines whether there are a predetermined number of surface planes having different normal vectors that correspond to the measurement data of the sensor 20A at the positions PO6 and PO7. In Step S16, the CPU 11 selects an unmeasured surface plane of the measurement object M2. In Step S13, measurement data of the selected plane is acquired. In Step S17, the CPU 11 finds the rotation parameters and the translation parameters which transform the coordinate system of the sensor 20A at the position PO7 into the coordinate system of the sensor 20A at the position PO6. In Step S18, the CPU 11 uses the rotation parameters and the translation parameters found in Step S17 to find a transformation expression that transforms the coordinate system of the sensor 20A at the position PO7 into the coordinate system of the sensor 20A at the position PO6. The CPU 11 stores the transformation expression in the memory 15.

As described above, according to the modification, configuration of the sensor group 20 of the data processing device 10 is simple like the third modification. Like the second modification, there is no need for configuration that changes a posture of the measurement object M2. Three or more surface planes of the measurement object M2 can be easily measured.

The above embodiment and modifications are examples of a preferable data processing device, data processing method, and recording medium according to the present invention. The present invention is not limited to this. For example, at least two of the above-described embodiment and modifications may be appropriately combined.

In the above embodiment and modifications, the measurement objects M1, M2 having physical planes are measured. The present invention is not limited to this. For example, a measurement object having a virtual plane or a device constituting a virtual plane may be measured.

For example, the virtual plane is formed by:
a measurement object in which light emitters are placed at at least three points on a plane in space; and
a device that forms a plane by controlling light emitters. The plane including the points is measured by a sensor.

Detailed configuration and detailed operation of parts of the data processing device 10 in the above embodiment can be changed within the scope of the claims of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A data processing device that processes measurement data measured by a sensor that measures three-dimensional coordinates of a measurement object from a first position and a second position which are different, comprising:
a controller that:
acquires measurement data of three or more planes of the measurement object from the sensor, the planes having different normal vectors as a result of a change of orientation of the measurement object relative to the sensor, and
finds, from the acquired measurement data, a transformation expression that integrates a coordinate system of the sensor at the second position into a coordinate system of the sensor at the first position;
wherein during operation, the measurement object is moved, and wherein a visual field of the sensor at the first position and a visual field of the sensor at the second position overlap.

2. The data processing device according to claim 1, wherein the sensor at the first position and the sensor at the second position are separate.

3. The data processing device according to claim 1, wherein one sensor serves as the sensor at the first position and the sensor at the second position.

4. The data processing device according to claim 1, wherein the sensor measures the three-dimensional coordinates of the measurement object from three or more different positions.

5. The data processing device according to claim 1, wherein the measurement object includes a physical plane.

6. The data processing device according to claim 1, wherein the measurement object includes a virtual plane.

7. The data processing device according to claim 1, wherein
a posture of the measurement object can be changed, and
the sensor at the first position and the sensor at the second position measure planes of the measurement object in changed postures.

8. The data processing device according to claim 1, wherein
the measurement object includes planes that can be measured in one posture, and
the sensor at the first position and the sensor at the second position measure the planes of the measurement object in the one posture.

9. The data processing device according to claim 1, wherein
from the acquired measurement data, the controller finds:
rotation parameters for rotation to align three-dimensional axes of the sensor at the second position with axes of the sensor at the first position; and
translation parameters for translation of an origin of a three-dimensional coordinate system of the sensor at the second position to an origin of a three-dimensional coordinate system of the sensor at the first position, and the controller finds the transformation expression from the found rotation parameters and translation parameters.

10. A data processing method of processing measurement data measured by a sensor which measures three-dimensional coordinates of a measurement object from a first position and a second position which are different, the method comprising:
   acquiring the measurement data of three or more planes of the measurement object from the sensor, the planes having different normal vectors as a result of a change of orientation of the measurement object relative to the sensor; and
   finding, from the acquired measurement data, a transformation expression that integrates a coordinate system of the sensor at the second position into a coordinate system of the sensor at the first position;
   wherein during operation, the measurement object is moved, and wherein a visual field of the sensor at the first position and a visual field of the sensor at the second position overlap.

11. A recording medium that stores a program which makes a computer of a data processing device function as a controller, the data processing device processing measurement data measured by a sensor that measures three-dimensional coordinates of a measurement object from a first position and a second position which are different,
   wherein the controller:
      acquires the measurement data of three or more planes of the measurement object from the sensor, the planes having different normal vectors as a result of a change of orientation of the measurement object relative to the sensor; and
      finds, from the acquired measurement data, a transformation expression that integrates a coordinate system of the sensor at the second position into a coordinate system of the sensor at the first position;
   wherein during operation, the measurement object is moved, and wherein a visual field of the sensor at the first position and a visual field of the sensor at the second position overlap.

* * * * *